3,297,698
PROCESS FOR THE PREPARATION OF
QUINAZOLINE 3-OXIDES

Werner Metlesics, Clifton, and Leo Henryk Sternbach, Upper Montclair, N.J., assignors to Hoffmann-La Roche Inc., Nutley, N.J., a corporation of New Jersey
No Drawing. Filed May 20, 1964, Ser. No. 369,020
4 Claims. (Cl. 260—256.4)

The present invention relates to novel chemical processes. More particularly, the invention herein set out relates in one aspect to a novel chemical process for the preparation of chemical compounds which can be characterized broadly in a chemical sense as being quinazoline 3-oxides. Such quinazoline 3-oxides can be converted by methods known per se to 1,4-benzodiazepines, such benzodiazepines being useful as medicinal agents by virtue of their pharmacological activity.

The novel process of the present invention comprises treating compounds of the formula

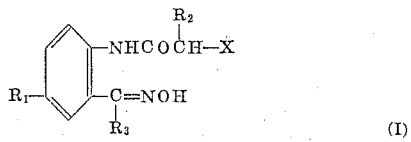

wherein X is halogen, preferably chlorine, bromine or iodine, $R_1$ is selected from the group consisting of hydrogen, halogen, trifluoromethyl, cyano, lower alkoxy, lower alkyl and nitro; $R_2$ is selected from the group consisting of hydrogen, lower alkyl and halogen and $R_3$ is selected from the group consisting of hydrogen, lower alkyl, a $C_4$-$C_6$ cycloalkyl group, phenyl, halophenyl, e.g., 2'-chlorophenyl, nitrophenyl, e.g., 2'-nitrophenyl, trifluoromethylphenyl, e.g., 2'-trifluoromethylphenyl and pyridyl, with an aprotic Lewis acid to thereby prepare quinazoline 3-oxides of the formula

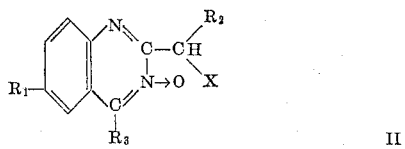

wherein $R_1$, $R_2$, $R_3$ and X have the same meaning as ascribed thereto hereinabove.

Compounds of Formula II above can be converted to 1,4-benzodiazepines. The conversion of compounds of Formula II above to pharmaceutically desirable benzodiazepines is effected by treating compounds of Formula II above with a suitable inorganic base such as an alkali metal hydroxide, e.g., sodium hydroxide, or an alkaline earth metal hydroxide, e.g., calcium hydroxide, or with an amine such as methyl amine, advantageously, in an inert organic solvent which may be a lower alkanol, for example, ethanol, acetone, a di-lower alkyloxy alkane such as dimethoxyethane or an ether such as dioxane. By the treatment with hydroxides, quinazolines of Formula II above are converted into 1,4-benzodiazepin-2-one 4-oxides. Alternatively, by the treatment with an amine, the quinazolines are converted to 2 lower alkyl amine 1,4-benzodiazepine 4-oxides. Such treatments of compounds of Formula II above to affect conversion to benzodiazepines are not an inventive feature of the instant application and thus, do not constitute a part of the present invention.

Heretofore, it has been known to treat compounds having the Formula I above with a mineral acid such as hydrochloric acid whereby to prepare compounds of the Formula II above. Such preparative procedures, however, have not resulted in satisfactory yields of quinazoline 3-oxides in every instance. Furthermore, corrosion problems are inherent in the use of strong mineral acids.

It is the object of the present invention to provide a process for the preparation of quinazoline 3-oxides of Formula II above from the corresponding oximes of Formula I above which results generally in high quality quinazoline 3-oxides in good yields.

It is a further objective of the present invention to provide a process for the preparation of quinazoline 3-oxide of Formula II above which lessens the likelihood of a corrosion problem arising.

In achieving these objectives within the purview of the present invention, it has been discovered by the present applicants that if an aprotic Lewis acid is utilized in the conversion of the oxime of the Formula I above to the corresponding quinaozine 3-oxide of Formula II above, the desired last-mentioned compound is achieved in good yield and of good quality.

Aprotic Lewis acids are non-proton containing molecules which are capable of accepting electron pairs (electron-deficient molecules). Aprotic Lewis acids are sometimes referred to in the art as substances which are suitable for use as catalysts in the Friedel-Crafts reaction. Representative of aprotic Lewis acids suitable for the purposes of the present invention are borontrifluoride, titanium tetrachloride, aluminum chloride, ferric chloride, zinc chloride, antimony trichloride, tin tetrachloride and the like. Especially preferred for the purposes of the present invention is an aprotic Lewis acid selected from the group consisting of borontrifluoride, titanium tetrachloride and aluminum chloride.

The amount of Lewis acid utilized is not critical. However, it should be present in sufficient quantities to effect complete cyclization of the oximes of Formula I above to the corresponding compounds of Formula II above. Temperature and pressure are not critical and the reaction can be effected at room temperature and atmospheric pressure or at elevated temperature and/or elevated pressure. Preferably, the reaction is effected at elevated temperatures, advantageously, according to one aspect of the present invention, at about the reflux temperature of the reaction medium in which the conversion of compounds of Formula I above to compounds of Formula II above is being effected. The conversion of compounds of Formula I above to the corresponding compounds of Formula II above can take place in the presence of any conveniently available inert organic solvent. Included among the solvents suitable for the purposes of the present invention are hydrocarbons such as benzene, toluene, xylene and the like, chlorinated hydrocarbons such as chloroform, chlorobenzene and the like or any suitable solvent.

The term "lower alkyl," as used throughout the instant disclosure and claims, is intended to connote both straight and branched chain hydrocarbon groups such as methyl, ethyl, N-propyl, isopropyl, butyl and the like. The term "lower alkoxy" represents a group such as methoxy. The term "halogen," as used throughout the disclosure, is intended to encompass all four forms thereof, i.e. chlorine, bromine, fluorine and iodine. The term "cycloalkyl" represents a group such as cyclobutyl, cyclopentyl, cyclohexyl and derivatives thereof.

The foregoing is a general description of the main synthetic routes for the preparation of quinazoline 3-oxides according to the new technique specified herein. It will be readily apparent to one skilled in the art that variations of these procedures are possible.

The following examples are illustrative but not limitative of the present invention. All temperatures stated are in degrees centigrade.

EXAMPLE 1

To a solution of 122 g. (0.34 mole) of the oxime of 2'-benzoyl-2,2,4'-trichloroacetanilide (α-form) in 2 l. of benzene at about 50°, 60 ml. of boron trifluoride etherate was added slowly with stirring. The mixture was protected from atmospheric moisture with a calcium sulfate drying tube and heated to reflux. Within a few minutes, white crystals began to appear. After refluxing for 6 hours, the reaction mixture was kept overnight at room temperature. Then 1 l. of water was added with stirring. The benzene layer was separated and washed once with 1 l. of H$_2$O and then with 2×500 ml. of 5 percent sodium bicarbonate. The aqueous layers were discarded and the organic phase was dried over sodium sulfate. Benzene was distilled off in vacuo and the yellow crystalline residue was stirred with 500 ml. of anhydrous ether and then chilled and filtered. It was thereafter dried in a vacuum oven at 40°. This gave 6-chloro-2-dichloromethyl-4-phenylquinazoline 3-oxide, melting at 150–151°. Recrystallization from a mixture of methylene chloride and hexane gave yellow plates melting at 153–154°.

A solution of 15 ml. of 2 N sodium hydroxide in 100 ml. of 1,2-dimethoxyethane was chilled to 0–5° and 5.0 g. (14.7 mmoles) of 6-chloro-2-dichloromethyl-4-phenylquinazoline 3-oxide were added. After 30 minutes at this temperature, 100 ml. of water was added slowly, keeping the temperature below 10°. Then, 3 N hydrochloric acid was added dropwise until the solution was neutral. The crystalline product was filtered off, washed with water and dried over phosphorus pentoxide in vacuum to give 3,7 - dichloro - 1,3-dihydro - 5 - phenyl - 2H - 1,4 - benzodiazepin-2-one-4-oxide, melting at 194–195° dec. Recrystallization from a mixture of tetrahydrofuran and hexane gave colorless needles melting at 210–211°.

The above-mentioned oxime of 2'-benzoyl-2,2,4'-trichloroacetanilide (α-form) and the process of preparing same are not part of this invention but such are disclosed herein in order that the present disclosure may be complete.

To a solution of 100 g. (0.406 mole) of 2-amino-5-chlorobenzophenone oxime (α-form) in 2 l. of ether, 500 ml. of water was added and the stirred mixture cooled in an ice bath to 5°. Then 44 ml. (67.3 g., 0.455 mole) of dichloroacetyl chloride was added slowly maintaining the temperature below +10° and keeping the reaction slightly alkaline by the simultaneous addition of 10 percent sodium hydroxide. The mixture was stirred for 30 minutes in the cold after all of the dischloroacetyl chloride had been added. The ether layer was then separated, washed twice with 500 ml. portions of cold water and dried over sodium sulfate. Most of the solvent was distilled off at atmospheric pressure and 100 ml. of benzene was added to the residue. The solvent was evaporated in vacuo to remove any water that remained. The residue was crystallized from benzene to give the oxime of 2'-benzoyl-2,2,4'-trichloroacetanilide (α-form), melting at 134–136°.

EXAMPLE 2

To a solution of 10 g. (28 mmoles) of the oxime of 2'-benzoyl-2,2,4'-trichloroacetanilide (β-form) in 200 ml. of benzene at 50°, there was added 5 ml. of boron trifluoride etherate. The mixture was then heated to reflux. After about 30 minutes, a solid began to crystallize. After 5 hours of refluxing, the reaction mixture was cooled to room temperature and stirred with 200 ml. of water. The organic layer was washed with dilute sodium bicarbonate, dried over sodium sulfate and the solvent then distilled off in vacuo. The residue crystallized when stirred with 50 ml. of ether to give 6-chloro-2-dichloromethyl-4-phenylquinazoline 3-oxide, melting at 147–149°.

The above-mentioned oxime of 2'-benzoyl-2,2,4'-trichloroacetanilide (β-form) and the process of preparing same are not part of this invention but such are disclosed hereinafter in order that the present disclosure may be complete.

To a solution of 100 g. (0.406 moles) of 2-amino-5-chlorobenzophenone oxime (β-form) in 2 l. of ether, 500 ml. of water was added and the stirred mixture cooled in an ice bath to 5°. Then, 44 ml. (67.3 g., 0.455 moles) of dichloroacetyl chloride was added slowly maintaining the temperature below +10° and keeping the reaction slightly alkaline by the simultaneous addition of 10 percent sodium hydroxide. The mixture was stirred for 30 minutes in the cold after all of the dichloroacetyl chloride had been added. The ether layer was then separated, washed twice with 500 ml. portions of cold water and dried over sodium sulfate. Most of the solvent was distilled off at atmospheric pressure and 100 ml. of benzene was added to the residue. The solvent was evaporated in vacuo to remove any water that remained. The residue was crystallized from benzene to give the oxime of 2'-benzoyl-2,2,4'-trichloroacetanilide (β-form), melting at 159–160°.

EXAMPLE 3

To a solution of 10 g. (25.6 mmoles) of the oxime of 2' - benzoyl-2,2-dichloro-4'-trifluoromethylacetanilide in 400 ml. of benzene, 5 ml. of boron trifluoride etherate was added and the mixture refluxed for 5½ hours. The solution became turbid after heating for about 15 minutes. After cooling, the reaction mixture was washed twice with 250 ml. of water and twice with 250 ml. of a 5 percent aqueous solution of sodium bicarbonate. The organic layer was dried over sodium sulfate and the solvent was distilled off in vacuo. On addition of 50 ml. of ether to the residue, 2-dichloromethyl-4-phenyl-6-trifluoromethylquinazoline 3-oxide crystallized. The product was found to have a melting point of 162–164°. It is capable of being reacted in the manner set out in Example 1 to prepare 3-chloro-7-trifluoromethyl-1,3-dihydro-5-phenyl-2H-1,4-benzodiazepin-2-one 4-oxide.

The above mentioned oxime of 2'-benzoyl-2,2-dichloro-4'-trifluoromethylacetanilide and the method of preparing same are not part of this invention but such are disclosed hereinbelow in order that the present disclosure may be complete.

To a stirred solution of 28 g. (0.1 mole) of the α-oxime of 2-amino-5-trifluoromethylbenzophenone in 500 ml. of ether, 150 ml. of water was added and the mixture chilled to 0–5°. Twenty-two ml. (34.6 g., 0.24 moles) of dichloroacetyl chloride was added slowly and, simultaneously, diluted sodium hydroxide was added to keep the reaction slightly alkaline. The reaction mixture was stirred for 30 minutes after all of the acid chloride was added. The organic layer was then separated, washed with water and dried over sodium sulfate. Solvent was then distilled off and the residue crystallized from a mixture of benzene and hexane to give the oxime of 2'-benzoyl-2,2-dichloro-4'-trifluoromethylacetanilide melting at 129–131°.

EXAMPLE 4

To a warm solution of 10 g. (27.2 mmoles) of the oxime of 2'-benzoyl-2,2-dichloro-4'-nitroacetanilide in 400 ml. of benzene, 5 ml. of boron trifluoride etherate were added. The mixture was then heated to reflux for 6 hours. During the course of the reaction an oily product separated. After cooling, the crude reaction mixture was washed with water and dilute sodium bicarbonate, dried over sodium sulfate and concentrated to dryness in vacuo. Crystallization of the residue from a mixture of tetrahydrofuran and hexane gave 2-dichloromethyl-6-nitro-4-phenylquinazoline 3-oxide crystallizing as yellow needles and melting at 194–195° and capable of being reacted in the manner set out in Example 1 to prepare 3-chloro-7-nitro-1,3-dihydro-5-phenyl-2H-1,4-benzodiazepin-2-one 4-oxide.

The above mentioned oxime of 2'-benzoyl-2,2-dichloro-4'-nitroacetanilide and the process of preparing same are not part of the present invention but such are disclosed hereinbelow in order that the present disclosure may be completed.

To a solution of 38 g. (0.15 moles) of the oxime of 2-amino-5-nitrobenzophenone in 1 l. of acetic acid containing 13.0 g. (0.15 moles) of sodium acetate, 0.15 moles of dichloroacetyl chloride was added slowly at room temperature with stirring. After 2 hours at room temperature, the solvent was distilled off in vacuo. The residue thus obtained was partitioned between methylene chloride and water and the organic layer was then washed with sodium bicarbonate. After drying over sodium sulfate, the solvent was distilled off and the residue crystallized from benzene to give the oxime of 2'-benzoyl-2,2-dichloro-4'-nitroacetanilide, melting at 144–145°. Further crystallization gave a product melting at 145–146°.

EXAMPLE 5

A suspension of 17.5 g. (0.071 mole) of the oxime of 2,4'-dichloro-2'-formylacetanilide in 500 ml. of benzene containing 13 ml. (0.1 mole) of boron trifluoride ethyletherate was heated to reflux for 7 hrs. On standing overnight at 25° crystals precipitated which were collected on a filter. This compound was suspended in methylene chloride and aqueous sodium bicarbonate and shaken until the crystals were dissolved in the organic phase. The methylene chloride layer was separated and concentrated. Addition of petroleum ether to the concentrate gave pale yellow needles of 6-chloro-2-chloromethylquinazoline 3-oxide melting at 197° (dec.). Recrystallization from a mixture of methylene chloride and petroleum ether gave white needles melting at 205–208° (dec.).

A suspension of 1 g. (0.004 mole) of 6-chloro-2-chloromethylquinazoline 3-oxide in 13 ml. of methanol containing 0.46 g. (0.015 mole) of methylamine was stirred at 25° for 17 hrs. The precipitate which formed was collected on a filter. It was recrystallized from a mixture of ethanol and ether to give 7-chloro-2-methylamino-3H-1,4-benzodiazepine 4-oxide as yellow prisms melting at 245° (dec.).

The above-mentioned oxime of 2,4'-dichloro-2-formylacetanilide, its method of preparation and intermediates useful therein are not part of the present invention but such are disclosed hereinbelow in order that the present disclosure may be complete.

A solution of 4 g. (0.02 mole) of 5-chloro-2-nitrobenzaldehyde oxime in 75 ml. of ethanol was hydrogenated at normal pressure and 25° using 0.3 g. of platinum oxide as catalyst. The hydrogen uptake was stopped after consumption of 1620 ml. of hydrogen. The dark brown solution which resulted was filtered to remove the catalyst and the filtrate was evaporated in vacuo. The crystalline residue was recrystallized from a mixture of ethanol and hexane to give 2-amino-5-chlorobenzaldehyde as white needles melting at 160–161°.

To a solution of 13.4 g. (0.079 mole) of 2-amino-5-chlorobenzaldehyde oxime in 750 ml. of ether was added 7 ml. (0.093 mole) of chloroacetyl chloride with stirring. The mixture was thoroughly shaken with a sodium bicarbonate solution. The crystalline precipitate which formed was collected on a filter and washed with ether yielding the oxime of 2,4'-dichloro-2'-formylacetanilide as white needles melting at 201–203° (dec). Recrystallization from a mixture of methanol and methylene chloride raised the melting point to 203–205° (dec.).

EXAMPLE 6

A solution of 1.1 g. of the α-form of 5-chloro-2-(chloroacetamido)-benzophenone oxime and 1 ml. of boron trifluoride etherate in 30 ml. of chloroform was heated to reflux for 18 hrs. The solution was cooled, washed with dilute sodium hydroxide, dried and concentrated on a steam bath. The oily residue on addition of ether gave 6-chloro-2-chloromethyl-4-phenylquinazoline 3 - oxide as yellow prisms melting at 133–134°.

EXAMPLE 7

A solution of 0.5 g. of the α-form of 5-chloro-2-(chloroacetamido)-benzophenone oxime and 1 ml. of titanium tetrachloride in 15 ml. of toluene was refluxed for 18 hrs. The solution was cooled, washed with water, dried and concentrated in vacuo. The oily residue on addition of ether gave 6-chloro-2-chloromethyl-4-phenylquinazoline as yellow prisms melting at 133–134°.

EXAMPLE 8

A solution of 1.1 g. of the β-form of 5-chloro-2-(chloroacetamido)-benzophenone oxime and 1 ml. of boron trifluoride etherate in 30 ml. of chloroform was heated to reflux for 18 hrs. The solution was cooled, washed with dilute sodium hydroxide, dried and concentrated on a steam bath. The oily residue on addition of ether gave 6-chloro-2-chloromethyl-4-phenylquinazoline 3-oxide as yellow prisms melting at 124–127°:

We claim:
1. A process for the preparation of a compound of the formula

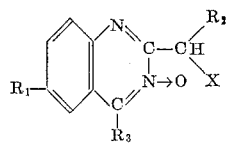

wherein X is selected from the group consisting of chlorine, bromine and iodine. $R_1$ is selected from the group consisting of hydrogen, halogen, trifluoromethyl, cyano, lower alkyl, lower alkoxy and nitro; $R_2$ is selected from the group consisting of hydrogen, lower alkyl and halogen; $R_3$ is selected from the group consisting of hydrogen, lower alkyl, a $C_4$–$C_6$ cycloalkyl group, phenyl, halophenyl, nitrophenyl, trifluoromethylphenyl and pyridyl, which comprises treating a compound of the formula

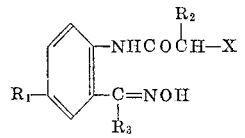

Wherein X, $R_1$, $R_2$ and $R_3$ are as above with an aprotic Lewis acid.

2. A process for the preparation of a compound of the formula

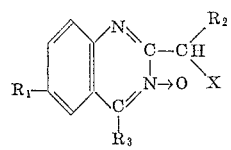

wherein X is selected from the group consisting of chlorine, bromine and iodine, $R_1$ is selected from the group consisting of hydrogen, halogen, trifluoromethyl, cyano, lower alkyl, lower alkoxy and nitro; $R_2$ is selected from the group consisting of hydrogen, lower alkyl and halogen; $R_3$ is selected from the group consisting of hydrogen, lower alkyl, a $C_4$–$C_6$ cycloakyl group, phenyl, halophenyl, nitrophenyl, trifluoromethylphenyl and pyridyl which comprises treating a compound of the formula

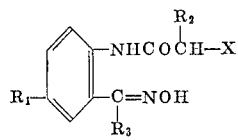

wherein X, $R_1$, $R_2$, and $R_3$ are as above with an aprotic Lewis acid selected from the group consisting of borontrifluoride, aluminum chloride, titanium tetrachloride and mixtures thereof.

3. A process as defined in claim 2 wherein the aprotic Lewis acid utilized is borontrifluoride.

4. A process as defined in claim 2 wherein the aprotic Lewis acid utilized is titanium tetrachloride.

No references cited.

NICHOLAS S. RIZZO, *Primary Examiner.*